B. F. WILKINSON.
NUT LOCK.
APPLICATION FILED FEB. 24, 1917.
1,246,689.
Patented Nov. 13, 1917.
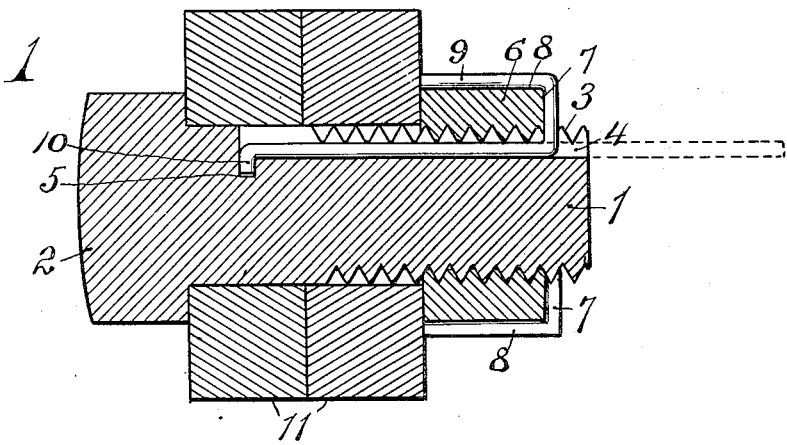
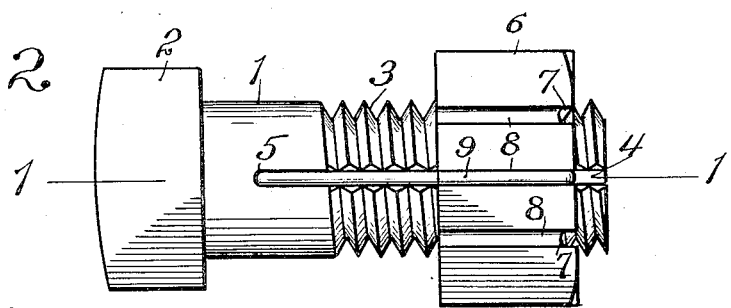
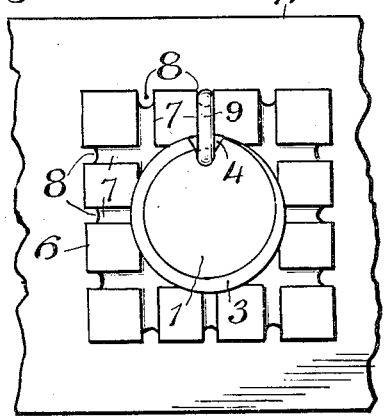
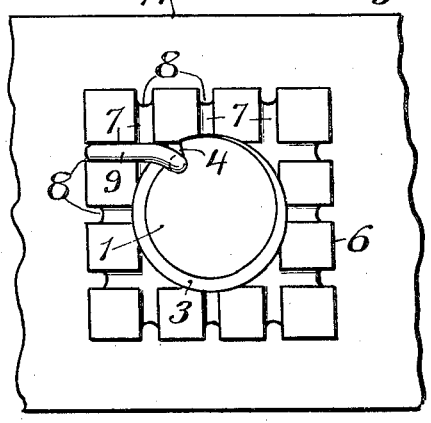
WITNESS:
R. C. Hamilton
INVENTOR.
Benjamin F. Wilkinson
BY Warren D. House
His ATTORNEY

UNITED STATES PATENT OFFICE.

BENJAMIN F. WILKINSON, OF INDEPENDENCE, MISSOURI, ASSIGNOR OF ONE-HALF TO MARY SALISBURY, SENIOR, OF INDEPENDENCE, MISSOURI.

NUT-LOCK.

1,246,689.      Specification of Letters Patent.      Patented Nov. 13, 1917.

Application filed February 24, 1917. Serial No. 150,676.

*To all whom it may concern:*

Be it known that I, BENJAMIN F. WILKINSON, a citizen of the United States, residing at Independence, in the county of Jackson and State of Missouri, have invented a certain new and useful Improvement in Nut-Locks, of which the following is a specification.

My invention relates to improvements in nut locks.

The object of my invention is to provide a nut lock which is economical to manufacture, which will have a maximum of strength and efficiency, and which may be easily operated.

The novel features of my invention are hereinafter fully described and claimed.

In the accompanying drawing which illustrates the preferred embodiment of my invention, Figure 1 is a longitudinal central sectional view on the line 1—1 of Fig. 2, showing my improvement in clamped engagement with two plates.

Fig. 2 is a plan view of a bolt and nut provided with my improvement.

Fig. 3 is an end view of the device with the locking pin disposed in one of the central grooves of the nut.

Fig. 4 is a view similar to Fig. 3, the locking pin being shown in one of the outer grooves in the nut.

Similar reference characters designate similar parts in the different views.

1 designates an ordinary bolt having a head 2 and the usual threaded portion 3.

A longitudinal groove 4 extends through and below the threaded portion 3 and at its inner end terminating at a point between the head 2 and the threaded portion 3.

The inner end of the groove 4 terminates in a shallow transverse hole 5 which extends only partly through the bolt 1.

6 designates an ordinary nut mounted on the threaded portion 3, and which is provided in its outer end with a plurality of grooves 7, which intersect the hole in the nut, and which are, preferably, disposed in two sets, one set being at right angles to the other set, and the grooves of each set being parallel with each other, the outer grooves of each set being disposed substantially tangential with the thread 3.

Each side of the nut 6 is provided with a plurality of parallel longitudinal grooves 8 which at their outer ends communicate respectively with adjacent grooves 7.

9 designates a locking pin disposed in the groove 4 and having its inner end bent transversely at right angles to form a short arm 10, Fig. 1, which is snugly fitted in the hole 5, the latter, preferably, having a diameter only slightly greater than the diameter of the body of the pin 9. By having the hole 5 shallow and only slightly larger in diameter than the diameter of the pin, and by having the hole 5 located intermediate of the head 2 and threaded part 3 of the bolt, the bolt is weakened to a minimum extent, while at the same time affording a suitable receptacle for the locking pin 9 and for holding the latter from being accidentally slipped outwardly from the groove 4.

The pin 9 extends from the groove 4 through the groove 7 which at the time the nut 6 is tightened, is in register with the groove 4. The pin 9 also extends into the groove 8 which communicates with the groove 7 containing the pin.

By having the grooves 7 of each set disposed parallel with each other, the milling of the grooves of each set may be effected at the same time, thus saving labor as compared with structures in which the grooves are all disposed radially in the end of the nut.

By having the outer grooves 7 approximately tangential with the thread 3, a greater number of adjustments is obtainable than with a radial arrangement of the grooves of like number.

In the operation of my invention, the locking pin 9 is first positioned in the groove 4, the outer end of the pin being straight as indicated in dotted lines in Fig. 1. The bolt 1 is then inserted through the two plates 11 which are to be clamped together, after which the nut 6 is screwed onto the bolt 1 and against the adjacent plate 11, the nut being left in a position in which one of the grooves 7 will register with the groove 4. The outer end of the locking pin 9 is then bent laterally so as to enter the groove 7 which is in register with the groove 4. The pin 9 is then again bent so as to lie within the groove 8 which communicates with the groove 7 containing the locking pin. The nut will now be locked from turning, and the arm 10 will hold the locking pin 9 from being accidentally withdrawn from the groove 4.

To release the nut 6, it is only necessary to straighten the outer end of the pin 9, after which the nut may be unscrewed, and the bolt 1 with the locking pin therein may be withdrawn from the plates 11.

Bolts usually break at the inner terminal point of the threaded portion. By extending the groove 4 into the unthreaded portion of the bolt between the head and the threaded portion and making only a shallow transverse hole at the inner end thereof and of a diameter only slightly larger than the diameter of the body of the pin 9, the bolt is weakened to a minimum amount, while at the same time affording means for reliably holding the pin from accidental withdrawal.

I do not limit my invention to the structure shown and described, as modifications, within the scope of the appended claims, may be made without departing from the spirit of my invention.

What I claim is:—

1. In a nut lock, a bolt having a longitudinal groove extending through and below the threaded portion of the bolt, a nut mounted on said bolt and having in its outer end a plurality of parallel grooves which intersect the hole through the nut and are adapted each to register with the groove in the bolt, one side of the nut having a plurality of parallel grooves respectively communicating with the grooves in the outer end of the nut, and a locking pin in the longitudinal groove and extending therefrom into one of the grooves in the end and side of the nut.

2. In a nut lock, a bolt having a longitudinal groove extending through and below the threaded portion of the bolt, a nut mounted on said bolt and having in its outer end a transverse groove disposed substantially tangential with the thread in the bolt and adapted to register with the groove in the bolt, and a locking pin in the longitudinal groove and extending therefrom into the groove in the nut.

3. In a nut lock, a bolt having a longitudinal groove extending through the threaded portion, a nut on said bolt having a plurality of parallel grooves in its outer end, which intersect the holes through the nut and are each adapted to register with the groove in the bolt, said grooves in the bolt and nut being adapted to receive a locking pin.

4. In a nut lock, a bolt having a longitudinal groove extending through the threaded portion to a point between the head and the threaded portion and at its inner end terminating in a shallow transverse hole, a locking pin in said groove and having its inner end transversely bent and snugly fitted in said hole, the hole having a diameter only slightly larger than the diameter of the pin, and a nut on said bolt and having at its outer end a plurality of parallel grooves intersecting the hole in the nut and adapted each to register with the groove in the bolt and to receive said pin.

In testimony whereof I have signed my name to this specification.

BENJAMIN F. WILKINSON.